(12) United States Patent
Huang et al.

(10) Patent No.: US 6,825,839 B2
(45) Date of Patent: Nov. 30, 2004

(54) METHOD AND APPARATUS FOR GENERATING ATOMIC PARTS OF GRAPHIC REPRESENTATION THROUGH SKELETONIZATION FOR INTERACTIVE VISUALIZATION APPLICATIONS

(75) Inventors: Zhiyong Huang, Singapore (SG); Tiow Seng Tan, Singapore (SG); Tong Wing Woon, Singapore (SG); Xuetao Li, Singapore (SG)

(73) Assignee: The National University of Singapore (SG)

( * ) Notice: Subject to any disclaimer, the term of this patent is extended or adjusted under 35 U.S.C. 154(b) by 157 days.

(21) Appl. No.: 09/793,677

(22) Filed: Feb. 27, 2001

(65) Prior Publication Data

US 2002/0030677 A1 Mar. 14, 2002

Related U.S. Application Data

(63) Continuation-in-part of application No. PCT/SG00/00109, filed on Jul. 27, 2000.

(30) Foreign Application Priority Data

Jul. 28, 2000 (SG) ............................................ 9903605

(51) Int. Cl.[7] .......................... G06T 15/30; G06T 17/20; G06T 17/00
(52) U.S. Cl. ....................................... 345/423; 345/420
(58) Field of Search ................................ 345/420, 428, 345/423, 419, 639, 490; 703/2

(56) References Cited

U.S. PATENT DOCUMENTS 5,825,369 A * 10/1998 Rossignac et al. .......... 345/440
5,894,308 A * 4/1999 Isaacs ......................... 345/420
6,054,991 A * 4/2000 Crane et al. ................. 345/420
6,563,500 B1 * 5/2003 Kim et al. ................... 345/423

FOREIGN PATENT DOCUMENTS

EP 0854441 7/1998

OTHER PUBLICATIONS

Computing Bounding Volume Hierarchies Using Model Simplification; Tan, Chong and Low; 1999; ACM Symposium; pp. 63–69.*
Space Sweep Solves Intersection of Convex Polyhedra; Hertel, Mantyla, Mehlhorn, and Nievergelt; 1984.*
Supowit, The Relative Neighborhood Graph, with an Application to Minimum Spanning Trees, 1983, pp. 428–448, ACM 0004 5411/83/0700–0428.*
Jaromczyk et al., A note on Relative Neighborhood Graphs, 1987, pp. 233–241, ACM 0–89791–231–4/87/0006/0233.*

(List continued on next page.)

Primary Examiner—Mark Zimmerman
Assistant Examiner—Scott Wallace
(74) Attorney, Agent, or Firm—Birch, Stewart, Kolasch & Birch, LLP

(57) ABSTRACT

This invention presents a method to extract atomic parts of a graphics model using its skeleton. A skeleton is a fully collapsed body of the model, and is obtained through a novel way to contract edges of the model. From the skeleton, atomic parts or features each is a part of the model that is distinctively autonomous from its connected or neighboring body is formed through space sweeping. Next, atomic parts can be connected into a hierarchy depending on the eventual interactive visualization applications. The operation of the method includes the steps of interactively computing, displaying and recording skeleton, atomic parts, and object hierarchies in response to user commands to, for example, modifying skeleton, atomic parts or object hierarchies. Object hierarchies are useful to various applications such as object scene management, view-dependent simplification, mesh-mapping, morphing, and building bounding volume hierarchies.

34 Claims, 8 Drawing Sheets

OTHER PUBLICATIONS

Shewchuk, Sweep Algorithms for Constructing Hlgher-Dimensional Constrained Delaunay Triangulations, pp. 350–359, ACM 2000 1-58113-224-7/0/6.*

Franklin, Polygon Properties Calculated From the Vertex Neighborhoods, pp. 110–118, ACM 0-89791-231-4/87/0006/0110.*

Nievergelt, "PLane-Sweep Algorithms for Intersecting Geometric Figures", pp. 739–747, ACM 0001-0782/82/1000-0739.*

Computers & Graphics, vol. 22(6), Dec. 1, 1998, pp. 667–674 A. Schilling and R. Klein "Rendering of Multiresolution Models With Texture".

Computers & Graphics, Voume 23(1) Jan. 2, 1999, pp. 59–72, D. Shikare, S. Gopalsamy et al. Zeus: Surface Modeling, Surface Grid Generation, Tetrahedral Volume Discretization.

[BARE96] G. Barequet, B. Chazelle, L. Guibas, J. Mitchell and A. Tal, BOXTREE: A Hierachical Representation for Surfaces in 3D', Proceedings Eurographics '96, vol. 15(3), Aug. 1996, pp. C-387-396, C-484.

[DEUS99] Deussen, O., Hamsel, J., Raab, A., Schlechtweg, S., Strothotte, T., "An Illustration Technique Using Hardware-Based Intersections and Skeletons", to appear in Proceedings Graphics Interface, Jun. 1999.

[GOTT96] S. Gottschalk, M.C. Lin and D. Manocha, "OBBTree: A Hierarchical Structure for Rapid Interference Detection", Computer Graphics (SIGGRAPH'96 Proceedings), 1996, pp. 171–179.

[GUIB85] Guibas and Stolf, "Primitives For The Manipulation Of General Subdivisions and the Computation of Voronoi Diagrams", ACM Transaction of Graphics, vol. 4, (1985), 74–123.

[HMMN84] S. Hertel, K. Mehlhorn, M. Mantyla and J. Nievergelt, "Space Sweep Solves Inersection of Two Convex Poyhedra", ACTA INFORMATICA 21, pp. 501–519, 1984.

[HOPP96] H. Hoppe, "Progressive Meshes", SIGGRAPH 96 Conference Proceedings, Annual Conference Series, Addison-Wesley, Aug. 1996, pp. 99–108, See also European Patent Document EP0789330A2, entitled "Selective Refinement of Meshes".

[KLOS98] J. Klosowski, M. Held, J. Michell, H. Sowizral and K. Zikan, "Efficient Collision Detection Using Bounding Volume Hierarchies of k-DOPs", IEEE Transactions on Visualization and Computer Graphics, vo. 4(1), 1998, pp. 21–36.

[LOW97] Kok-Lim Low and Tiow-Seng Tan, "Model Simplification Using Vertex-Clustering", Proceedings on Symposium On Interactive 3D Graphics, 1997, pp. 75–81.

[TAN99] Tiow-Seng Tan, Ket-Fah Chong and Kok-Lim Low, "Computing Bounding Volume Hierarchies Using Model Simplification", Proceedings on Symposium On Interactive 3D Graphics, 1999, pp. 63–69.

* cited by examiner $v0 = 1, v1 = 3, vn = 6$

Before:

INC(1,2) = {0}
INC(1,4) = {0, 1}
INC(1,3) = {1}
INC(2,4) = {0}
INC(3,4) = {1, 2}
INC(3,5) = {2}
INC(4,5) = {2}

VNB(1) = {2, 3, 4}
VNB(2) = {1, 4}
VNB(3) = {1, 4, 5}
VNB(4) = {1, 2, 3, 5}
VNB(5) = {3, 4}

TL(0) = {1, 4, 2}
TL(1) = {1, 3, 4}
TL(2) = {3, 5, 4}

After:

INC(2,4) = {0}
INC(2,6) = {0}
INC(4,6) = {0, 2}
INC(4,5) = {2}
INC(5,6) = {2}

VNB(2) = {4, 6}
VNB(4) = {2, 5, 6}
VNB(5) = {4, 6}
VNB(6) = {2, 4, 5}

TL(0) = {6, 4, 2}
TL(2) = {6, 5, 4}

ATL(4,6) = {1}

(a) Original mesh (b) After contracting edge $(v_5, v_6)$ to vertex $v_9$ (c) After contracting edge $(v_2, v_3)$ to vertex $v_{10}$ (d) After contracting edge $(v_4, v_7)$ to vertex $v_{11}$ (e) After contracting edge $(v_8, v_9)$ to vertex $v_{12}$

METHOD AND APPARATUS FOR GENERATING ATOMIC PARTS OF GRAPHIC REPRESENTATION THROUGH SKELETONIZATION FOR INTERACTIVE VISUALIZATION APPLICATIONS

This application is a Continuation-In-Part of PCT International Application No. PCT/SG00/00109 filed on Jul. 27, 2000, which designated the United States and on which priority is claimed under 35 U.S.C. §120, the entire contents of which are hereby incorporated by reference.

FIELD OF THE INVENTION

The present invention relates generally to computer graphics and solid modeling, and more particularly, to methods and apparatuses for representing and displaying an object of its skeleton, atomic parts, and hierarchy.

BACKGROUND OF THE INVENTION

The quest for ease of modeling in three-dimensional computer graphics has led to the development of several well-known techniques, such as constructive solid geometry, free-form deformation, non-uniform rational B-splines, or more recently, implicit surfaces. Today's graphics hardware, however, is only capable of dealing with polygons efficiently. Hence, models are often tessellated before display for efficient rendering.

Related to 3D modeling is 3D model acquisition. The difficulty of obtaining a good 3D model has led to development in this area, using methods such as laser range scanners and turntable techniques. Such methods produce massive point sets representing points on the model's surface and require further processing such as 3D triangulation. The result is again a polygon mesh.

A tradeoff has to be established between having a high quality model with a high polygon count, and fast rendering with fewer polygons. The ever-increasing number crunching capability of today's processors tends to push the envelope of polygon count for efficient rendering, making it feasible to use more complex models.

Working on the premise of polygon mesh, however, leads to many difficulties. A polygon mesh is inherently unstructured, making it expensive to perform geometric operations such as intersection tests in collision detection and ray tracing. In the present invention, we are interested in object representation as in its object hierarchy.

The object hierarchy is most natural in terms of the human concept of shape. This has to do with the fact that cognition works best for hierarchically organized systems. In fact, 3D modelers often exhibit this phenomenon unknowingly when they organize an object in a top-down fashion. Although the object hierarchy is a natural representation of shape, it is often non-unique and designer-specific. Even so, the variations are usually minor and do not affect the conceptualization of the model on the whole. The present invention describes an algorithm for determining first a collection of atomic parts of an input polygon mesh and for determining a unique hierarchy from the atomic parts.

It is conceivably easy to obtain an object hierarchy from certain representations of models, for instance, constructive solid geometry models. However, the same cannot be said of geometric models, particularly B-rep models, which are by far the most prevalent. UCOLLIDE [TAN99] is a collision detection system that makes use of simplification to compute bounding volume hierarchies. The novelty of this work lies in the use of cluster-based simplification [LOW97] for extracting shape, and the use of this shape information for computing bounding volume hierarchies. Traditionally, bounding volume hierarchies are generated by top-down partitioning or bottom-up merging. Bottom-up methods only work well for organizing objects in a scene, and not polygons per se. Top-down methods perform poorly when the object to be partitioned consists of many sparsely arranged parts. Hence, it is difficult to achieve optimal or near optimal bounding volume hierarchies using either method.

[TAN99] uses simplification and shape analysis to extract the major components (or atomic parts) of an object. Further shape analysis on the simplified model yields the components of the model. Partitioning on each component can then be done using traditional top-down methods.

For complex models with numerous interconnected parts, it is insufficient to use only one simplified model or also called level-of-details (LOD) for shape analysis. This is because it is difficult to pinpoint one LOD that captures all the essential features of a model. By using a few LODs, the decomposition of a model can be guided along each node of the parent LOD and a hierarchy is naturally obtained. Although reasonably good results can be obtained using this method, there are some issues that remain to be addressed:

(i) the association of polygons in a lower LOD to a higher one may not be straightforward;

(ii) it is not clear what is the desired number of LOD and how to choose them;

(iii) different LODs produce different results; and (iv) vertex clustering can cause topology change in the model. How this affects decomposition is unclear.

In addition, simplification using vertex clustering is not incremental. The algorithm needs to be invoked a number of times for LOD generation and this can cause a performance penalty. In light of all these issues, an alternative formulation of shape extraction is developed in the current invention.

SUMMARY AND OBJECTS OF THE INVENTION

The invention described herein satisfies the above-identified needs and overcomes the limitations of the prior invention by [TAN99]. The present invention describes a new system and method to effectively generate object hierarchies, for purposes of various interactive applications such as:

(i) Organizing an arbitrary mesh for scene management and view-dependent simplification;

(ii) Providing an alternative structure to one given by modeler;

(iii) Visualizing complex models;

(iv) Mesh-mapping; for morphing, establishing correspondence; and (v) Building bounding volume hierarchy (BVH) for intersection tests in collision detection and ray tracing.

Specifically, disclosed herein is a method for execution by a data processor that generates effective object hierarchies. The method includes the following steps:

(1) Preprocessing. This is to prepare data structures for subsequent processes.

(2) Skeletonization. This is the process of deriving a skeleton of the input model, where skeleton is a fully collapsed body of the model.

(3) Generating Atomic Parts. This is the process of obtaining various features (which is a part of the model that is distinctively autonomous from its connected or neighboring body) from the skeleton.

(4) Postprocessing. This process connects various atomic parts obtained from previous step into a hierarchy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
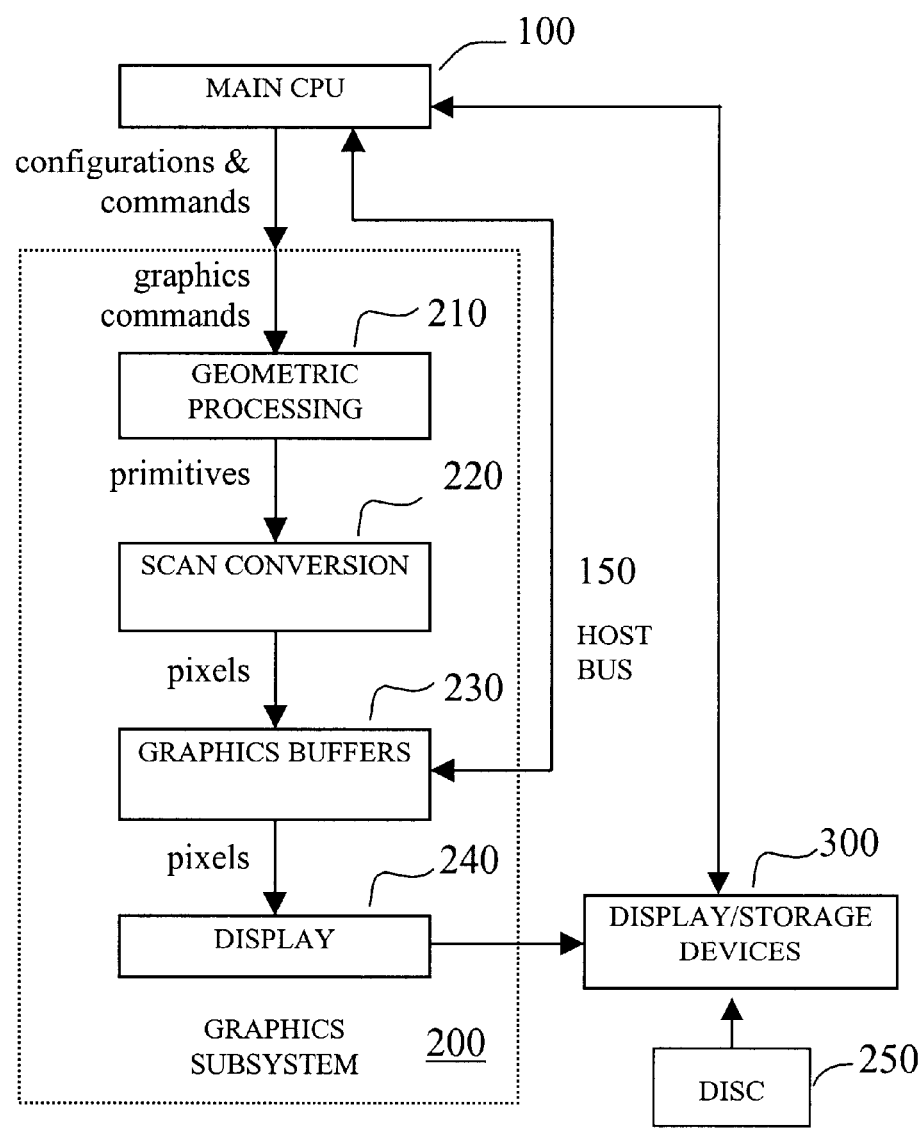
FIG. 1 is a block diagram of an exemplary raster graphics system.

FIG. 1 illustrates an exemplary raster graphics system that includes a main (Host) processor unit 100 and a graphics subsystem 200. The Host processor 100 executes an application program and dispatches graphics tasks to the graphics subsystem 200. The graphics subsystem 200 outputs to a display/storage device 300 connected thereto.

The graphics subsystem 200 includes a pipeline of several components that perform operations necessary to prepare geometric entities for display on a raster display/storage device 300. For the purposes of describing the invention, a model of the graphics subsystem is employed that contains the following functional units. It should be realized that this particular model is not to be construed in a limiting sense upon the practice of the present invention.

A Geometric Processor unit 210 performs geometric and perspective transformations, exact clipping on primitives against screen (window) boundaries, as well as lighting computations. The resulting graphics primitives, e.g. points, lines, triangles, etc., are described in screen space (integral) coordinates.

A Scan Conversion (Rasterization) unit 220 receives the graphics primitives from the geometric processor unit 210. Scan converter unit 220 breaks down the graphics primitives into raster information, i.e. a description of display screen pixels that are covered by the graphics primitives.

A Graphics Buffer unit 230 receives, stores, and processes the pixels from the Scan Conversion unit 220. The graphics buffer unit 230 may utilize conventional image buffers and a z-buffer to store this information. A Display Driver unit 240 receives pixels from the Graphics Buffer unit 230 and transforms these pixels into information displayed on the output display device 300, typically a raster screen.

Figure 2:
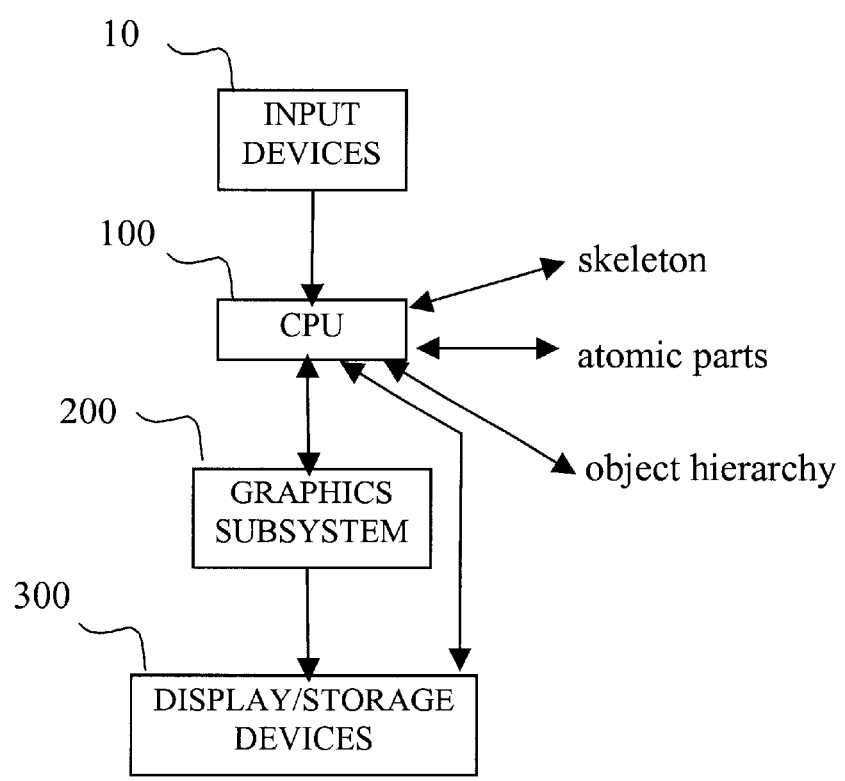
FIG. 2 is a simplified diagram of a graphics processing system according to the present invention.

FIG. 2 is a simplified diagram of a graphics processing system according to the present invention. As shown in FIG. 2, an input device 10 inputs graphics data to be processed by the present invention. The CPU 100 processes the input data from input devices 10 by executing an application program. CPU 100 also dispatches graphics tasks to the graphics subsystem 200 connected thereto. The output results (skeleton, atomic parts, and object hierarchy) may then be stored and/or displayed by display/storage devices 300.

Having described an exemplary graphics processing system that is suitable for use in practicing the present invention, a description is now provided of a method of extracting atomic parts from a polygon mesh and the arrangement of these parts into a hierarchy.

For the purposes of describing the present invention, it is assumed that objects are described in polygonal boundary representations (b-reps). Models with curved surfaces are tessellated, i.e. approximated with planar triangles. This is to facilitate display as well as edge contraction, as will be described in the following section.

Figure 3:
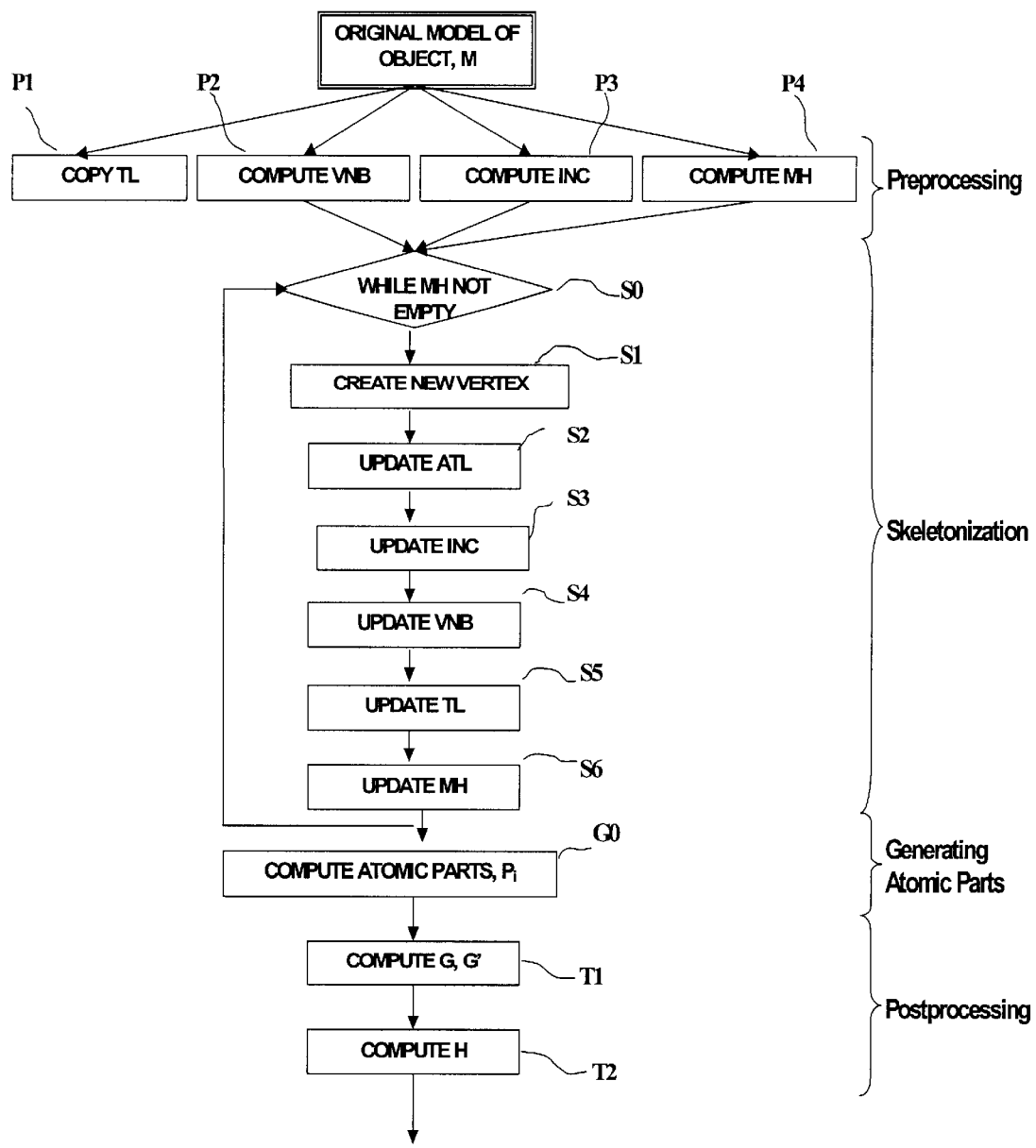
FIG. 3 is a flowchart that depicts the method steps according to the present invention.

FIG. 3 shows a flowchart of the algorithm.

Preprocessing Step

The purpose of preprocessing is to compute the necessary data structures required for subsequent processing. In particular, the following steps are performed: (P1) making a copy of the original tessellated triangle list, (P2) computing a vertex neighborhood graph, (P3) computing an incident edge table, and (P4) computing min heap for all the edges in the model. Notice that some of these steps, such as (P2) and (P3), are not necessary if the input object representation comes with such information.

For the purpose of describing the preprocessing step, it is assumed that the original model is represented by a vertex table VT and a triangle list TL. The vertex table VT contains the supporting vertices used in the model. The triangle list TL contains the triangles used in the model and each triangle is represented as an ordered list of references (indices) to the vertex table VT. In addition, there may be other augmented structures such as a facet normal table and a vertex normal table, but these are normally not used. The contents of the vertex table VT and triangle list TL are volatile during the execution of the algorithm. In another embodiment, the original model can be represented as an edge-based data structure (instead of vertex-based as assumed in the description) such as the winged-edge data structure and quad-edge data structure [GUIB85]. It is straightforward for those skilled in the art to do the necessary adaptation from the following description to work on edge-based data structures.

(P1) Making a Copy of the Original Tessellated Triangle List

It is essential to make a copy of the original tessellated triangle list. This is because the edge contraction step performs in-place updating on the triangle list as new vertices are added. In one embodiment of this operation, the triangle list is used for rendering of intermediate results. When edge contraction is completed for all the edges in the model, the tessellated triangle list is restored so that the original model can be rendered.

(P2) Computing Vertex Neighborhood Graph VNB

The vertex neighborhood graph VNB is used to store connection information between vertices. More specifically, if vertex v0 and v1 are neighbors, e.g. (v0,v1) of an edge of a triangle, then v1 ∈ VNB(v0) and v0 ∈ VNB(v1). The vertex neighborhood graph VNB is used extensively during the edge contraction step. A simple way of implementing VNB is to use a two-dimensional array where each row represents the list of vertices related to the vertex index. A more efficient method is to use an adjacency list.

(P3) Computing Incident Edge Table INC

The incident edge table INC is another data structure used in edge contraction. The elements of the incident edge table INC are defined as follows: for any valid edge (v0, v1) in the model, INC(v0, v1) gives the list of triangles that are incident to this edge. The incident edge table INC can be implemented using a hash table. A simple hashing formula could be given as follows:

$$Key = \begin{cases} v0 * \text{displacement\_factor} + v1 & \text{if } v0 < v1 \\ v1 * \text{displacement\_factor} + v0 & \text{otherwise} \end{cases}$$

displacement_factor is an arbitrary integer larger than the number of vertices in the model.

(P4) Computing Min Heap MH for all the Edges in the Model

The min heap is a data structure whereby the smallest element or the element with the smallest weight is always at the top of the heap. Thus, it is easy to retrieve the smallest weight item from the min heap. It is also efficient to remove the smallest weight item whilst maintaining the property of the min heap. After computing incident edge table INC, the list of all edges is easily known. The min heap is then obtained by adding all edges using the length of each edge as its weight. Thus, edges are retrieved in increasing order of length. In another embodiment of this method, the weight of each edge is computed based on some pre-calculated value of its vertices. These are variations that serve to improve the results and do not detract from the objective of this operation. The min heap can be implemented using a linear array.

Skeletonization Step

Simplification is the process of obtaining a simpler form of a model while preserving certain attributes, such as appearance, as much as possible. In the context of geometric models, a simpler model is one with fewer numbers of triangles and vertices. While the applications of simplification are mainly in the arena of level-of-detail modeling, there have been ingenious applications like Collision Detection [TAN99], Progressive Mesh [HOPP96] and Skeletonization [DEUS99]. The approach taken by the former is based on the vertex clustering principle while the other two use edge contraction. Hoppe [HOPP96] employs edge contraction for simplification and compression, with emphasis on appearance preservation. Deussen et. al. [DEUS99] in turn implements a simpler version of edge contraction for the purpose of defining intersection planes for non-photorealistic rendering.

The process of skeletonization in this invention is different in its methodology of edge contraction. Furthermore, the resulting skeleton is not the end product; rather the crux of the operation lies in the association of triangles into parts forming the skeleton.

Figure 4:
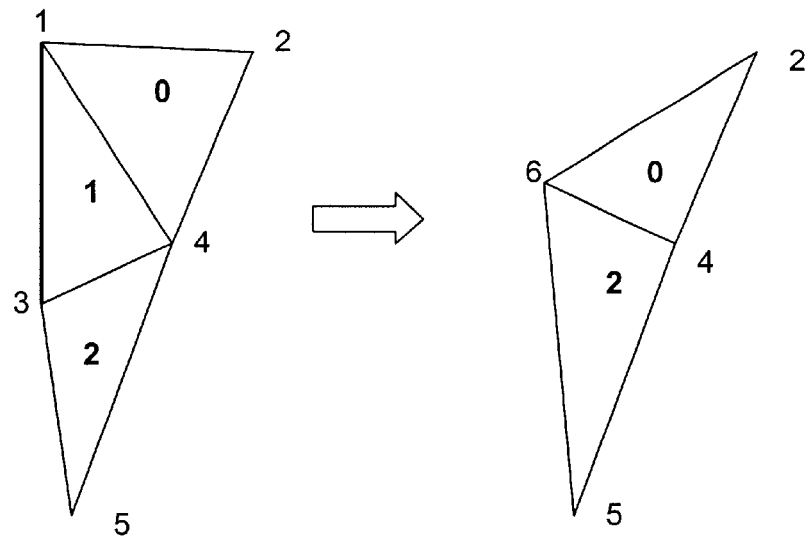
FIG. 4 is an edge contraction example utilizing method as described in the present invention.
Figure 6:
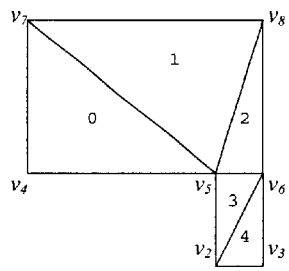
FIG. 6 is an example on contracting edges to form a skeleton containing a virtual edge.
Figure 6:
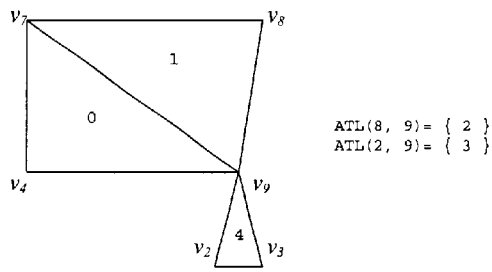
Figure 6:
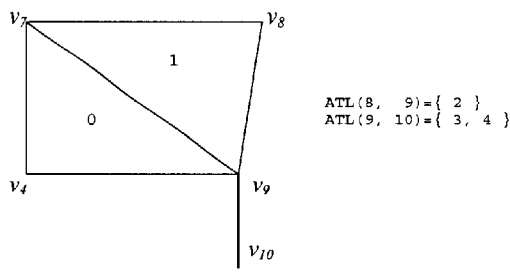
Figure 6:
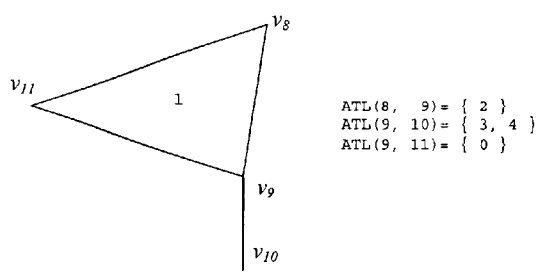
Figure 6:
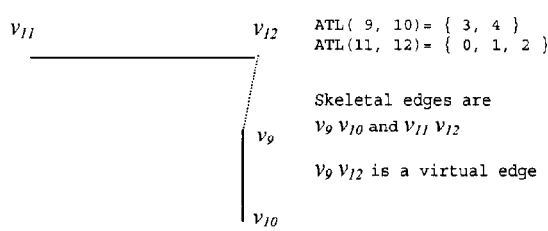

A skeleton is defined as the result of a collapsed model. Edge contraction refers to the process of collapsing edges into vertex. For the purpose of describing the present invention, assume that the current edge to be collapsed is represented by (v0,v1) where v0 and v1 are the vertices of its endpoints. FIG. 4 illustrates this process. Unless otherwise stated, edge contraction is performed until the min heap MH of all edges is empty (S0). An additional data structure is required in this method to store associated triangles and this is known as the associated triangle list ATL (which is initialized to empty set at the beginning of the skeletonization step). The detailed steps in edge contraction consist of: (S1) creation of new vertex, (S2) updating of associated triangle list ATL, (S3) updating of incident edge table INC, (S4) updating of vertex neighborhood graph VNB, (S5) updating of triangle list TL, (S6) updating min heap MH and skeleton S. FIG. 6 shows a complete example of the process.

(S1) Creating New Vertex

Given v0 and v1 are vertices to be collapsed, a straightforward method of creating a new vertex vn would be (v0+v1)/2. In another embodiment, the new vertex is given the coordinate of v0 or v1 if either v0 or v1 belong to an existing (skeletal) edge in skeleton S. In either case, the new vertex vn is appended at the end of the vertex table VT.

(S2) Updating of Associated Triangle List ATL

Since v0 and v1 are vertices of at least one triangle, the collapsing of v0 and v1 would cause at least one triangle to be removed from the model. In addition, the change of vertex numbering, i.e. v0 →vn and v1 →vn, violates the validity of the associated triangle list ATL. The purpose of this step is to keep track of the removed triangles, as well as to update the vertex number in the associated triangle list ATL. The following algorithm exhaustively enumerates the types of updating involved:

(i) for each vertex v★ in VNB(v0)\{v1 }, rename ATL(v0, v★) as ATL(vn, v★)

(ii) for each vertex v★in VNB(v1)\{v0 }, rename ATL(v1, v★) as ATL(vn, v★)

(iii) for each triangle T in INC(v0, v1) with v2 be its third vertex, do store T to ATL(v2, vn)

store ATL(v0, v2) and ATL(v1 v2) to ATL(v2, vn)

store ATL(v0, v1) to ATL(vn, vn)

store ATL(v0, v0 ) and ATL(v1, v1) to ATL(vn, vn)

(S3) Updating of Incident Edge Table INC

The collapsing operation (v0, v1)→vn requires that the incident edge table INC be updated. The algorithm for performing this update is given as follows:

(i) for each vertex v★in VNB(v0)\{v1 }, rename INC(v0, v★) as INC(vn, v★)

(ii) for each vertex v★in VNB(v1)\{v0 }, rename INC(v1, v★) as INC(vn, v★)

(iii) for each triangle T in INC(v0, v1) with v2 be its third vertex, do delete T from INC(v2, vn)

(iv) remove INC(v0, v1)

(S4) Updating of Vertex Neighborhood Graph VNB

As in step (S3), it is mandatory to maintain the validity of vertex neighborhood graph VNB after the collapsing operation. The algorithm for this update is as follows:

(i) add VNB(vn)=VNB(v0)∪VNB(v1)\{v0, v1}

(ii) delete VNB(v0) and VNB(v1)

(iii) for each vertex v★in VNB(vn), update VNB(v★)= VNB(v★)\{v0, v1}∪{vn}

(S5–S6) Updating of Triangle List TL, Min Heap MH and Skeleton S

The triangle list TL is updated so that collapsed vertices are renamed to vn. Note that if a high fidelity rendering is required, the affected normals in facet normal table and vertex normal table are to be recomputed. For the sake of efficiency, the updating of min heap MH and skeleton S are also performed under this step. It is not efficient to update MH directly, as this would involve examining the entire heap. Instead, only affected edges are reinserted into the min heap MH. When an edge is retrieved, its validity can be ascertained by checking against the incident edge table INC.

The algorithm for performing this update is as follows:
for each vertex vi in VNB(vn), do
    if INC(vn, vi) is not empty
        for each triangle T in INC(vn, vi), do
            find and rename vertex v0 or v1 in T to vn
            let wt=f(vi, vn) where f could be the length function
            heap_insert(MH, edge(vi, vn), wt)
    otherwise
        add edge (vn, vi), termed the skeletal edge (vn, vi), to S Generating Atomic Parts Having obtained the collection of skeletal edges forming the skeleton and the data structure ATL, the next step is to compute the list of atomic parts associated with the model (FIG. 3, step G0). One simple embodiment is to define an atomic part as the collection of triangles that represent a connected part of the skeleton. More formally, it is obtained from the following derivation:

Let R be a relation on S such that aRb (i.e. a related to b) if there exists a path from a to b in S.

R is an equivalence relation under S.

Obtain the set of equivalence classes of R, called $Q_i$ where i=1 to m.

Figure 5:
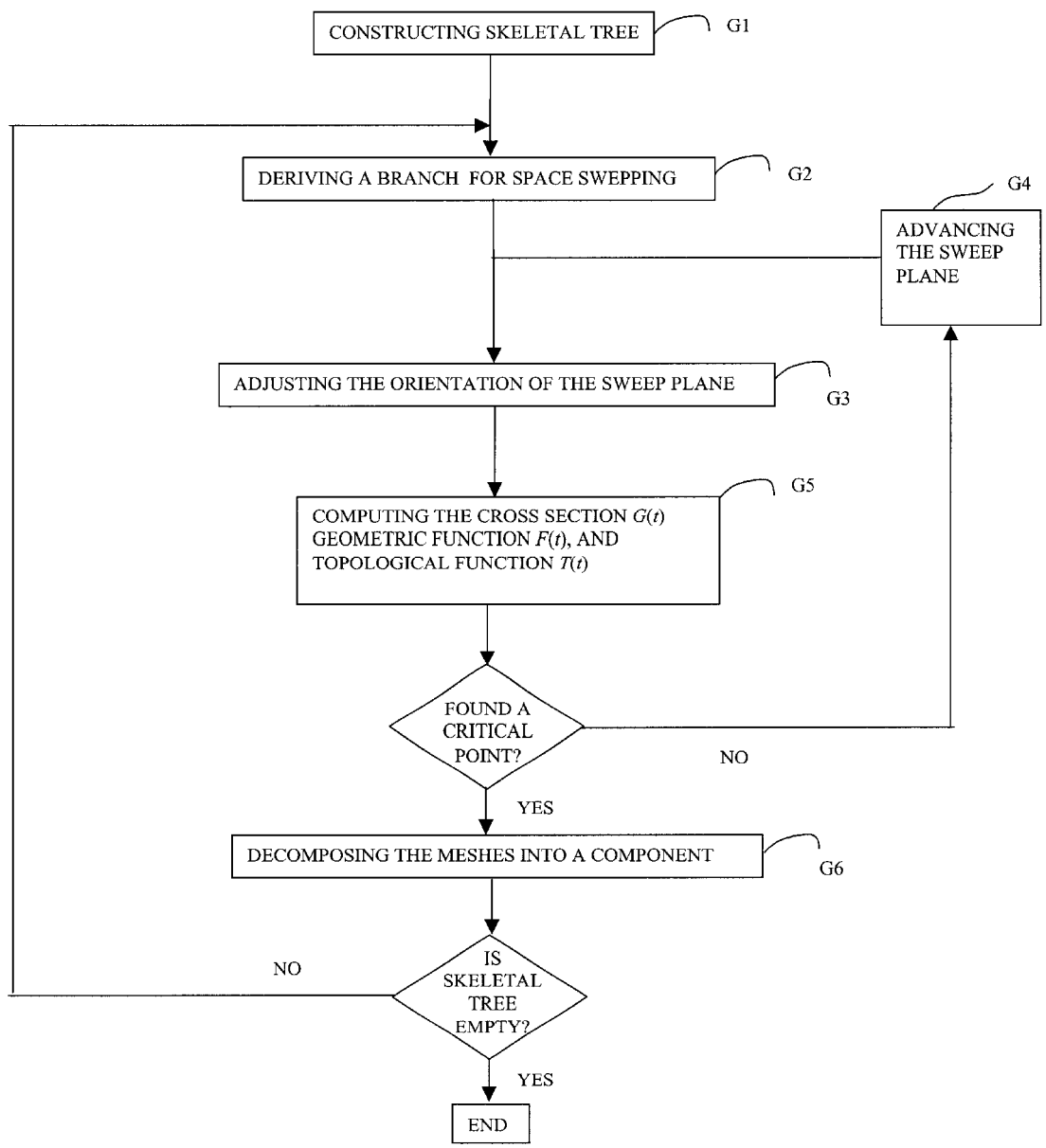
FIG. 5 is a flowchart that depicts the steps of computing atomic parts utilizing space sweeping.

For each $Q_i$, form an atomic part $P_i = \cup ATL(vj, vk)$ where (vj, vk)$\in S_i$ and vj, vk$\in Q_i$ In another embodiment, the space-sweep technique [HMMN84] is adopted to sweep the given polygon mesh with a plane, called the sweep plane, along some sweep path $[t_{start}, t_{end}]$. FIG. 5 shows the detailed steps in extracting atomic part adopting the space sweeping. Skeletal edges provide a good basis for sweeping, but before that can be done the set of skeletal edges is organized (that are disjoint in general) into a linear order for sweeping.

To do this, a skeletal tree is obtained from the skeleton (Step G1). Then a traversal order of the edges is defined of the skeletal tree by grouping them into so-called branches (Step G2). The ordering of space sweeping is determined by the ordering the branches. The sweeping paths are determined by the positions of the branches. During the space sweeping in advancing the sweep plane (Step G4) at some location called sweep location, the orientation of the sweep plane is adjusted to better intersect the polygon mesh (Step G3). The intersection between the sweep plane and the polygon mesh defined the cross-section at the sweep location. Cross-section is used to compute a geometric function and a topological function (Step G5). These functions define whether the sweep location is a critical point. The identification of critical points define the boundaries of some atomic parts (Step G6).

(G1) Constructing the Skeletal Tree

During skeletonization, a triangle is either contracted to a skeletal edge or an endpoint on a skeletal edge. Consider triangles $\Delta_1$ and $\Delta_2$ that are incident to a same edge. Suppose $\Delta_1$ is contracted to b and $\Delta_2$ is contracted to d where (a, b) and (c, d) are two disjoint skeletal edges. To connect them, a virtual edge (b, d) is added to the collection of skeletal edges. For the example of FIG. 6, $\Delta v_5 v_6 v_8$ and $\Delta v_5 v_2 v_6$ sharing ($v_5$, $v_6$) are contracted to $v_{12}$ and $v_9$ respectively; we thus have the virtual edge ($V_{12}$, $v_9$).

On the other hand, suppose Al is contracted to b and $\Delta_2$ is contracted to (c, d), where (a, b) and (c, d) are two disjoint skeletal edges. An issue is as to whether (b, c) or (b, d) should be a virtual edge. This is resolved because as the computation of virtual edges is in fact an integral part of the skeletonization process. The skeletonization process creates a virtual edge whenever two disjoint parts are the resulted of an from edge contraction (rather than after the whole process). That is (b, c) should be a virtual edge if b was a result of contracting some edge incident to c, and likewise for (b, d).

For a connected mesh, the result of adding virtual edges is a connected graph. Such a graph is called a skeletal tree if it has no cycles. Otherwise, cycles are removed by applying the standard minimal spanning tree algorithm. The cost between each pair of nodes u and v is defined as the inverse of the size of ATL(u,v).

(G2) Locating a Branch for Sweeping

From a leaf vertex of the skeletal tree, a branch is defined—starting with the edge incident to the leaf vertex—as the maximal chain of edges whose vertices (excluding the first and the last) are incident to exactly two edges in the skeletal tree. Each branch corresponds to one continuous part of the whole sweep path $[t_{start}, t_{end}]$, with the leaf vertex as the starting point, and the last vertex of the chain as the ending point. In general, there are, as many branches as the number of leaves.

The union of the ATL over the edges of a branch, with first vertex u and last vertex v, corresponds to a part of the object. Its surface area can be approximated as:

$$A = (\text{length of branch}) * \frac{f(u) + f(v)}{2}$$

where f(t) measures the perimeter of the cross-section at t. In one embodiment, we can assuming f(t) varies linearly over the branch (as the skeletonization results in fairly uniform branches), thus can simplify the computation to the following:

$$A = \int_u^v f(t) dt$$

Branches are then ordered for sweeping based on surface area of their ATL. Those branches having a smaller area are favored for sweeping first. This ordering allows small but significant atomic parts to be extracted first so that they are not absorbed into larger part of some bigger atomic parts. During sweeping, edges of the skeletal tree that have been swept are removed.

(G3 and G4) Orienting and Advancing the Sweep Plane

Figure 7:
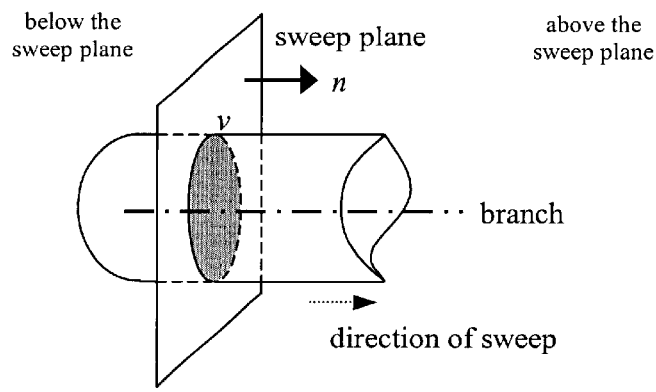
FIG. 7 is a diagram to illustrate the notion of below, on, and above the sweep plane.

To begin a space sweep, a branch is used and its corresponding set of triangles, which are obtained from the union of the ATL's of edges from the branch. The sweep plane, given by P(t)=P(v, n), is determined by a reference point v and a normal vector n as shown in FIG. 7. For any given vertex u from the mesh, its direction from v may be computed. If (v−u)·n<0, u is below the sweep plane. If it is equal to zero, u lies on the plane. Otherwise u is above the sweep plane.

The reference point v is either a vertex of the mesh or a point on an edge of the mesh. Specifically, v is on the boundary of the cross-section G(t). Initially, n is the normal vector along the first skeletal edge of a given branch B. v is then an arbitrary point along the intersection of the mesh and the sweep plane passing through the first endpoint of B.

Since the polygon mesh is a discrete representation, only an approximate sweep path need be obtained, by advancing in discrete steps. To advance P(v, n) to a new v, one way is to move it to the next nearest vertex above the sweep plane. In this way, the total number of cross-sections will be proportional to the number of vertices of the mesh. For dense meshes, this is an expensive operation. For such cases, a more pragmatic embodiment is to advance in fixed steps. In order not to over- or underestimate the step size, the amount can also be computed as a function of the edge length distribution.

Each branch comprises a set of skeletal edges which provide a general direction for the sweep plane movement. However, the orientation of the skeletal edge is not necessarily good, as it is dependent on the result of edge contraction. To account for this, the orientation of the sweep plane is not entirely based on the skeletal edges but computed adaptively.

Hence, when the sweep plane advances from P(u, n) to P(v, n), its orientation is subjected to change. To compute n', it is first set to n. It is then adjusted so that the sweep path will follow the natural orientation ($n_s$) of the volume. Specifically, it is advantageous to have n' oriented based on the normal vectors of triangles $\Delta_i$ in $\Delta$ (which is the set of intersecting triangles at the cross-section—see step G5 below). We define $n_s$ as follows:

$$n_s = \sum_{i=1}^{k} N(\Delta_i) \times N(\Delta_{i+1}),$$

where $N(\Delta_i)$ and $N(\Delta_{i+1})$ are normal vectors of consecutive triangles in $\Delta$ (with $\Delta_{k+1}=\Delta_1$), ordered in an anticlockwise manner about n'. Intuitively, the cross product of $N(\Delta_i)$ and $N(\Delta_{i+1})$ captures the essence of a local optimal direction for the sweep plane with respect to the shared edges of $\Delta_i$ and $\Delta_{i+1}$. Thus, the sum over all such cross products points to an aggregated direction.

(G5) Computing Cross-Section, Geometric and Topological Functions

Figure 8:
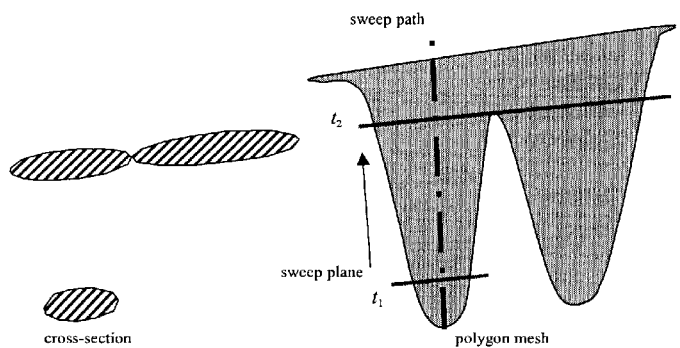
FIG. 8 is a diagram to illustrate the cross-section, which is the intersection of the sweep plane with the polygon mesh.

An edge in the polygon mesh is an intersecting edge of P(t) if one of its endpoints is either on or above P(t), and the other endpoint is on or below P(t). An intersecting triangle of P(t) is a triangle incident to one or more intersecting edges of P(t). The set of intersecting triangles of P(t) is denoted as $\Delta=\{\Delta_i|i=1, 2, \ldots, k\}$. The intersection of P(t) with A is a collection of line segments forming the boundary of G(t). This boundary is either a single simple polygon (see $t_1$ of FIG. 8) or a collection of simple polygons (see $t_2$ of FIG. 8). From this boundary, two functions are defined:

(1) The Geometric function F(t) is given by $$F(t)=\text{measure}(G(t)),$$

where measure is the measurement, such as the area or perimeter of cross-section G(t).

(2) The Topological function T(t) is given by $$T(t) = \begin{cases} 0, & \text{topology of } G(t-\varepsilon) \text{ is different from } G(t) \\ 1, & \text{otherwise} \end{cases}$$

where $\epsilon$ is an arbitrarily small positive number.

With intersecting triangles of P(t) in $\Delta$, it is easy to compute the geometric function F(t). To compute the derivatives of F(t) (as needed in the computation of critical point in the following discussion), we use previous values (up to five) of F(t) to find delta differences in the computation. Also, standard filters, such as Gaussian or median, can be used to smooth out the values.

To compute T(t), we first define H, a function of the cross-section G(t), as the number of simple polygons in G(t). Note that G(t-$\epsilon$) and G(t) are homotopic if G(t-$\epsilon$) can be deformed continuously into G(t) and vice versa. This property implies that their boundaries are also homotopic, that is, H( G(t))=H(G(t-$\epsilon$)). With that, we arrive at the following alternative definition of T(t):

$$T(t) = \begin{cases} 1, & H(G(t-\varepsilon)) = H(G(t)) \\ 0, & H(G(t-\varepsilon)) \neq H(G(t)) \text{ or } G(t) \text{ degenerates to a point} \end{cases}$$

Since we only need to compare between G(t-$\epsilon$) and G(t), only two cross-sections need to be stored throughout the computation.

(G6) Decomposing Mesh into Atomic Part

Figure 9:
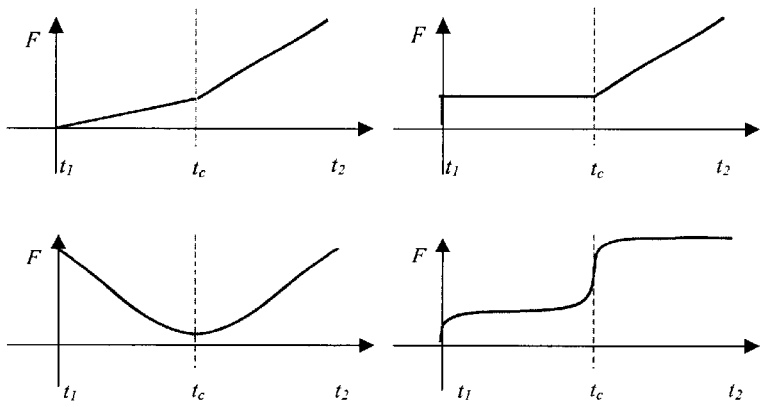
FIG. 9 is a sample profiles of the geometric function F(t)

A critical point in the sweep path is a boundary point between atomic parts that captures change in either geometry, topology or both. FIG. 9 shows some sample profiles of F(t). Other possible profiles such as symmetric ones or combination of the given examples are considered in a similar way. At $t_c$ as indicated by dashed lines, each of the profiles is divided into two segments. Naturally, it is desirable to grant the interval [$t_1$, $t_c$] and [$t_c$, $t_2$] to two different atomic parts. By computing a few derivatives of the profiles, it is found that the common characteristic of all profiles at $t_c$ is that $F^{(n)}(t_c)=0$, where $F^{(n)}$ is the first vanishing derivative of F(t) for some n, and $F^{(n)}$ crosses zero at $t_c$. In order to restrict atomic parts to simple shapes, there is an additional constraint that topology must be constant, i.e. T(t) must be non-zero in each atomic part. From these conditions, a critical point at t is defined as:

$$(F^{(n)}(t)=0 \text{ and } F^{(n)}(t-\epsilon) \cdot F^{(n)}(t+\epsilon)<0) \text{ or } T(t)=0$$

In the course of sweeping, the geometric and topological functions are computed and analyzed (Step G5). When a consecutive pair of critical points is found, the part of the polygon mesh that is swept is extracted as an atomic part.

From T(t) and the derivatives of F(t), it is determined whether t is a critical point as defined above. When a critical point is reached, triangles swept so far that are not part of other atomic parts are extracted as a new atomic part. For intersecting triangles in $\Delta$, they can be included in the new atomic part, or split up along their intersection with the sweep plane, depending on the application.

Postprocessing Step

The objective of post-processing is to derive the object hierarchy representing the original model M by organizing the atomic parts in a meaningful way. The object hierarchy is defined as a rooted tree where the root node is the original model M and each level below it is a breakdown of the node into mutually exclusive parts. The leaf nodes are atomic parts obtained in previous step. Hierarchy construction makes use of the relationship between connected atomic parts and this relationship is defined by the connection graph G as follows:

$$G=\{(P_i, P_j) | \exists t_p \epsilon P_i, t_q \epsilon P_j \text{ and } t_p, t_q \text{ shares an edge}\},$$

For models containing disjointed parts, the connection graph G is also disjointed. In that case, each connected subgraph is treated as an independent connection graph and is dealt with separately. Spatial analysis (see [TAN99]) could later be applied to join them up into a hierarchy. For the rest of the discussion on hierarchy building, G is assumed connected.

G is undirected and could possibly contain cycles. The presence of cycles could create problems for some hierarchy construction methods. Hence it is necessary to first transform the graph into a tree. One way of doing this, in step T1, is to compute the minimal spanning tree (MST) G' of G. The cost of each edge in G could be some function, such as cosine, of the angle formed by orientations of the endpoints. The cost function is chosen as such because a sharp angle formed by the parts indicate that they probably should not be joined in the first place.

One way of computing an orientation would be to use the axis of least inertia, which is fairly expensive to compute in three-dimensions. Alternatively, the orientation is approximated by the largest eigenvector in the principal component analysis (PCA) of the object.

Having obtained G' for each connected subgraph of G, hierarchy construction can begin (step T2). Three types of hierarchical construction method are disclosed in the following paragraphs: (1) unrooted folding method (2) rooted folding method (3) common edge method. The use of a particular method may depend on the eventual applications of the constructed hierarchy.

(1) Unrooted Folding Method

This method applies to the default configuration, in which G' is unrooted. Nodes of degree larger than one with at least one or more leaf neighbors are tagged. At each step of the algorithm, tagged nodes are collapsed to form a new node in the object hierarchy H. The algorithm for building H is as follows:

add $P_1, P_2, \ldots, P_m$ to H while $|G'|>1$ add nodes each is of degree larger than one and has at least one or more leaf neighbors to a queue, Q
while P=dequeue(Q) is not empty
  create a new node M' in H to be parent of leaf neighbors of P
  create a new node M'' in H to be parent of M' and P
  delete leaf neighbors of P from G'
  rename P to M'' in G'

(2) Rooted Folding Method

The unrooted folding method gives a simple way of constructing the hierarchy, without a priori knowledge of the model. However, the hierarchy constructed this way may be lopsided and not really reflect the natural partitioning of the model. A better way would be to pick a representative node in G' to be the root. A representative node could be the node with the largest bounding volume (representing a dominant part), or one with the highest degree (representing a center of focus), or could be selected manually by the user. Hierarchy construction would be similar as before, except that it is now done bottom-up. The rooted folding method for building H is as follows:

add $P_1, P_2, \ldots, P_m$ to H while $|G'|>1$ let h be the height of G'
add nodes at level (h−1) to Q
while P=dequeue(Q) is not empty
  create a new node M' in H to be parent of leafs of P
  create a new node M'' in H to be parent of M' and P
  delete leafs of P from G'
  rename P to M'' in G'

(3) Common Edge Method

For geometric objects with many interconnected parts it may be difficult to choose a representative node to be the root. In that case, it may be useful to have a metric for evaluating the "strength" of connection between parts. This metric should measure the relative importance of an atomic part and its neighbors. In one embodiment, the metric that is used in this method is the relative length of the common edges between two parts and is defined as follows:

common$(P_i, P_j)=\Sigma\|(v_a, v_b)\|$ s.t. $(v_a, v_b)$ in $t_k$ where $t_k \epsilon P_i$ and $(v_a, v_b)$ in $t_l$ where $t_l \epsilon P_j$ boundary$(P_i)=\Sigma\|(v_a, v_b)\|$ s.t. $(v_a, v_b)$ in $t_k$ where $t_k \epsilon P_i$ and not $t_l \epsilon P_i$ s.t. $(v_a, v_b)$ in $t_l$ relative$(P_i, P_j)$=common$(P_i, P_j)$/min(boundary$(P_i)$, boundary$(P_j)$)

The method of construction is to keep removing edges based on a function of its metric. Such function may either be taking, in one embodiment, the largest, or, in another embodiment, the smallest metric. The algorithm for building H is as follows:

add $P_1, P_2, \ldots, P_m$ to H while $|G'|>1$ get $(P_i, P_j)$ from G' with f (relative$(P_i, P_j)$) where f could be max or min function
create a new node M' in H to be the parent of $P_i$ and $P_j$
collapse $P_i$ and $P_j$ to new node M' (corresponding to M' in H) in G'

The above completes the description of the hierarchy building process. As mentioned in the summary and objects of the invention, there are various interactive applications that can benefit from the computed object hierarchy. In the following, the use of the object hierarchy for one such application is described explicitly; other applications within the spirit and scope of the invention will become apparent to those skilled in the art from such a discussion.

Application to Collision Detection

One of the most time consuming operation in collision detection is the object intersection test. This is also true for the ray intersection test in ray-tracing. It is generally accepted that a tight bounding volume is good for such tests since it will ensure that pruning is done as soon as possible. Recent developments in this area lead to efforts such as BOXTREE [BARE96], OBBTree [GOTT96] and k-DOP [KLOS98], to name a few. Most of them either take the top-down approach of partitioning or the bottom-up approach of merging, with no inherent interest in the shape of the model as a whole. Top-down partitioning is ineffective for models that are sparse, as the level of representation is too coarse at the top levels. Bottom-up methods suffer from efficiency problems since obtaining a globally optimal solution is prohibitively expensive.

As described earlier, UCOLLIDE [TAN99] uses a series of simplified models to extract parts of models, hence taking advantage of their shape. However, it is not clear how many simplified models to use or how to select them to get the best result.

The present invention presents an automated way of obtaining the object hierarchy that is easily convertible into a bounding volume hierarchy suitable for collision detection and ray tracing. The atomic parts $P_1, P_2, \ldots, P_m$ which form the leaf nodes of H are in general simple shapes. Hence top-down partitioning methods can be applied effectively to reduce $P_i$ to leaf nodes containing a single or small number of triangles.

For a disjoint connection graph G, the MST of each connected subgraph $G_i$ forms a hierarchy $H_i$ representing the object hierarchy of congregate part $R_i$, the collection of polygons of the nodes in $G_i$. Let bounding_box($R_i$) be the size of the bounding volume of $R_i$. The choice of bounding volumes is application dependent and transparent to the algorithm. The algorithm for merging the various $H_i$ makes use of pair-wise merging of smallest enclosing bounding volume to obtain a locally optimal solution.

while $|R|>1$ get $R_i$, $R_j$ from R with the smallest bounding_box($R_i \cup R_j$)
create a new node M' in H to be the parent of $H_i$ and $H_j$
collapse $R_i$, $R_j$ to new node M' (corresponding to M' in H) in R This manner of hierarchy building is similar in nature to existing bottom-up methods described in [BARE96] and [TAN99].

The resulting tree H may be reorganized by picking a new root to achieve a more balanced result. To control the branching factor, H may also be converted into a binary tree. Note that this is done on a per node basis, and does not involve alteration to the original model M.

Operation of the Method of the Invention

Figure 10:
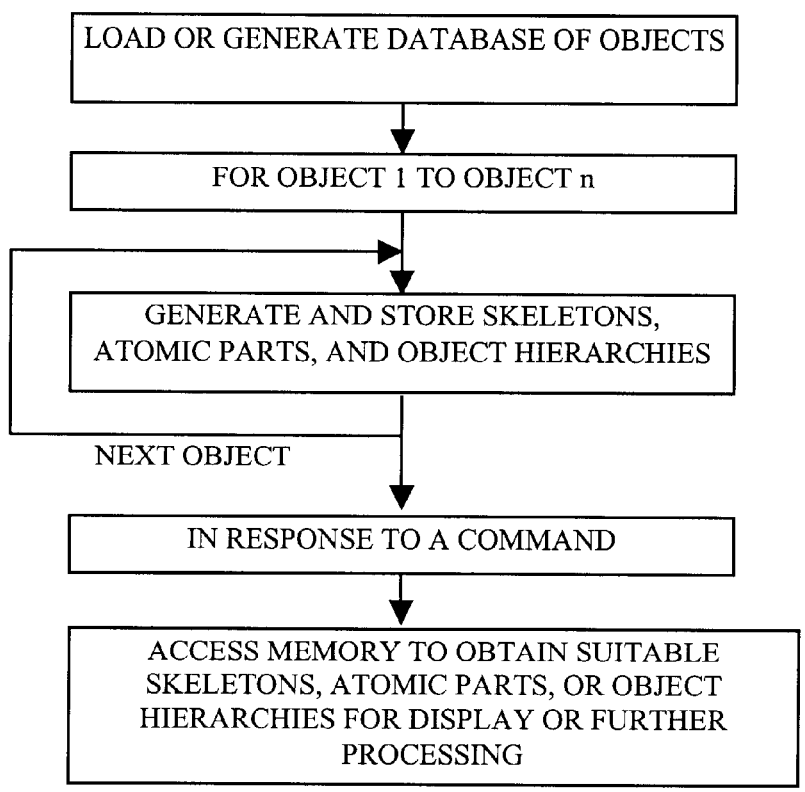
FIG. 10 is a flowchart that depicts the operation of the method according to the present invention.

FIG. 10 is a flowchart that depicts the operation of the method of the present invention in obtaining object hierarchies. First, the system loads or generates a database of objects appearing in a scene (M1). These objects may be elements of, for example, a CAD database or a virtual environment. For each of these objects, in step M2, skeleton, atomic parts, and object hierarchies are generated as detailed in FIG. 3. The input models and the skeletons, atomic parts, and object hierarchies are stored in the memory as shown in FIG. 2. At this point, the system is ready to begin an interactive display session with a user.

A user can issue commands to, for example, display skeleton, atomic parts, or object hierarchies. Also, the user can interactively do adjustment to modify skeletons, atomic parts or object hierarchies, and the system accesses the memory to obtain the suitable data structures for modification and to pass them to the graphics subsystem for display of the data structures on the display screen. Additionally, in response to the user requests M4, the system can use skeletons, atomic parts, and object hierarchies to compute other data structures such as the bounding volume hierarchies, as described earlier, for use in ray-tracing or virtual environment navigation to determine collisions M5.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

References

[BARE96] G. Barequet, B. Chazelle, L. Guibas, J. Mitchell and A. Tal, "*BOXTREE: A Hierarchical Representation for Surfaces in 3D*", Proceedings Eurographics '96, Vol. 15(3), August 1996, pp. C-387–396, C-484.

[DEUS99] Deussen O., Hamsel J., Raab, A., Schlechtweg, S., Strothotte T., "*An Illustration Technique Using Hardware-based Intersections and Skeletons*", to appear in Proceedings Graphics Interface, June 1999.

[GOTT96] S. Gottschalk, M. C. Lin and D. Manocha, "OBBTree: A Hierarchical Structure for Rapid Interference Detection", Computer Graphics (SIGGRAPH '96 Proceedings), 1996, pp. 171–179.

[GUIB85] Guibas and Stolf, "*Primitives for the manipulation of general subdivisions and the computation of Voronoi diagrams*", ACM Transaction of Graphics, vol. 4, (1985), 74–123.

[HMMN84] S. Hertel, K. Mehlhorn, M. Mantyla, and J. Nievergelt, "*Space Sweep Solves Intersection of Two Convex Poyhedra*", ACTA INFORMATICA 21, pp. 501–519, 1984.

[HOPP96] H. Hoppe, "*Progressive Meshes*", SIGGRAPH 96 Conference Proceedings, Annual Conference Series, Addison-Wesley, August 1996, pp. 99–108. See also European Patent Documents EP0789330A2, entitled *Selective Refinement of Meshes*.

[KLOS98] J. Klosowski, M. Held, J. Mitchell, H. Sowizral and K. Zikan, "*Efficient Collision Detection Using Bounding Volume Hierarchies of k-DOPs*", IEEE Transactions on Visualization and Computer Graphics, vol. 4 (1), 1998, pp. 21–36.

[LOW97] Kok-Lim Low and Tiow-Seng Tan, "*Model Simplification Usin Vertex-Custering*", Proceedings on Symposium On Interactive 3D Graphics, 1997, pp. 75–81.

[TAN99] Tiow-Seng Tan, Ket-Fah Chong and Kok-Lim Low, "*Computing Bounding Volume Hierarcies Using Model Simplification*", Proceedins on Symposium On Interactive 3D Graphics, 1999, pp. 63–69.

What is claimed is:

1. A method for execution by a data processor to process a model having a collection of triangles representing an object into atomic parts, comprising the steps of:

preprocessing the model to generate data structures for subsequent processing;

generating a skeleton of the model; and generating atomic parts of the model by space sweeping with a sweep plane wherein said preprocessing step includes:

computing a vertex neighborhood graph VNB, an incident edge table INC, and a min heap MH of edges, and maintaining edges in the min heap MH such that an associated weight of an edge is the length of the edge and an edge having the smallest weight is maintained on the top of the min heap MH.

2. The method as set forth in claim 1, further comprising the step of maintaining edges in the min heap MH such that a weight of an edge is some pre-calculated value of the edge's endpoints (vertices) and an edge having the smallest weight is maintained on the top of the min heap MH.

3. The method as set forth in claim 1, wherein said step of generating a skeleton of the model comprises:

letting edge (v0, v1) be a min weight edge from the min heap MH;

collapsing (v0, v1) into a new vertex vn;

appending vn at an end of a vertex table VT;

updating associated triangle lists (ATLs) for all of the affected vertices and edges;

updating an incident edge table INC for all of the affected edges;

updating the vertex neighborhood graph VNB for all of the affected vertices;

updating a triangle list TL, the min heap MH and a skeleton S where necessary; and repeating the above steps if necessary, until the min heap MH is empty.

4. The method as set forth in claim 3, wherein said new vertex vn is on a midpoint of the edge being collapsed.

5. The method as set forth in claim 3 wherein said new vertex vn is snapped to one of the two endpoints of the edge which belongs to some existing skeletal edges computed so far.

6. The method as set forth in claim 3, wherein said updating step includes determining that a skeletal edge is to be added when an edge collapse causes an incident triangle list INC to become empty.

7. The method as set forth in claim 3, further comprising maintaining a virtual edge (b,d) between two disjoint skeletal edges (a,b) and (c,d) when two triangles, that are incident to a same edge in the given model, are contracted one to b and the other to d.

8. The method as set forth in claim 3, further comprising maintaining a virtual edge (b,d) between two disjoint skeletal edges (a,b) and (c,d) when two triangles, that are incident to a same edge in the given model, are contracted one to b and the other to (c,d) and b was a result of contracting some edge incident to c.

9. A method for execution by a data processor to process a model having a collection of triangles representing an object into atomic parts, comprising the steps of:
preprocessing the model to generate data structures for subsequent processing;
generating a skeleton of the model; and
generating atomic parts of the model, wherein the step of generating the atomic parts of the model includes space sweeping to obtain the atomic parts as follows:
constructing the skeletal tree; and
repeating the following steps until the skeletal tree is empty:
locating a branch in the skeletal tree for sweeping;
orienting and advancing the sweep plane;
computing cross-section, geometric and topological functions;
identifying critical points to decompose mesh into the atomic parts where each atomic part is defined between two consecutive critical points found; and
removing a branch that has just been swept.

10. The method as set forth in claim 9, wherein said constructing step includes a step to use the computed skeleton with virtual edges as a skeletal tree by removing any cycles in the skeleton via a standard minimal spanning tree algorithm, where the cost of each skeletal edge is defined as the inverse of the size of its associated triangle list.

11. The method as set forth in claim 9, wherein said locating a branch for sweeping includes a step to prioritize the available branches for sweeping based on the total surface area of the union of triangles in associated triangle lists (ATLs) associated to each branch, in favor of small total surface area.

12. The method as set forth in claim 11, wherein the total surface area of the union of the triangles in associated triangle lists (ATLs) associated to a branch can be approximated by the length of the branch multiplied with the average of the perimeters of the branch at its two endpoints.

13. The method as set forth in claim 9, wherein said orienting and advancing the sweep plane step includes a step to set initially the sweep plane so that it passes through the first endpoint of a branch b under sweeping and has normal vector along a first skeletal edge of b.

14. The method as set forth in claim 9, wherein said orienting and advancing the sweep plane step includes a step to advance the sweep plane $P(u, n)$, passing through u with normal vector n, to $P(v, ns)$, passing through v with normal vector ns, where v is the next nearest mesh vertex above the sweep plane along the normal direction n, and ns is the sum of the cross products of normal vectors of consecutive triangles in the set of intersecting triangles at the cross-section.

15. The method as set forth in claim 14, wherein said v is derived by a fixed increment amount to u above the sweep plane where the fixed increment amount is a function of the distribution of the lengths of edges in the given model.

16. The method as set forth in claim 9, wherein the geometric function is given by a function on the area of the cross-section.

17. The method as set forth in claim 9, wherein the geometric function is given by a function on the perimeter of the cross-section.

18. The method as set forth in claim 9, wherein the topological function is a measure on the change in topology of the cross-section.

19. The method as set forth in claim 9, wherein the critical point is a point on the boundary of the given model where there is a change in either the geometry function or the topological function, or both.

20. A method for execution by a data processor to process a model having a collection of triangles representing an object into atomic parts, comprising the steps of:
preprocessing the model to generate data structures for subsequent processing;
generating a skeleton of the model;
generating atomic parts of the model by space sweeping with a sweep plane;
computing a connection graph G of the atomic parts based on the connectivity of the original model;
computing a minimal spanning tree (MST) G' for each connected subgraph of G; and
computing an object hierarchy H from each G'.

21. The method as set forth in claim 20, wherein the step of computing G' for each connected subgraph of G includes a step of using the cosine of the orientation of atomic parts as the cost function.

22. The method as set forth in claim 21, wherein the step of computing the cosine of the orientation of atomic parts includes the step of computing the orientation from the axis of least inertia.

23. The method as set forth in claim 21, wherein the step of computing the cosine of the orientation of atomic parts includes the step of computing the orientation from the largest eigenvector in the principal component analysis of the atomic parts.

24. The method as set forth in claim 20, wherein the step of computing an object hierarchy H from each connected connection graph G' having atomic parts {P1, P2,,Pm }, is accomplished with the following steps:

add $P1, P2, \ldots, Pm$ to $H;$ while $|G'|>1$ add nodes where each is of degree larger than one and has at least one or more leaf neighbors to a queue, Q; and
while P =dequeue(Q) is not empty
create a new node M' in H to be parent of leaf neighbors of P; create a new node M" in H to be parent of M' and P;
delete leaf neighbors of P from G'; and rename P to M" in G'.

25. The method as set forth in claim 20, wherein the step of computing an object hierarchy H from each connected connection graph G' having atomic parts {P1, P2,,Pm }, is accomplished with the following steps:

add P1, P2, ... , Pm to H;

pick a representative node in G' to be the root; and while |G'|>1 add nodes at level (h−1) to Q, where h is the height of G'; and while P =dequeue(Q) is not empty create a new node M' in H to be parent of leafs of P;

create a new node M" in H to be parent of M' and P;

delete leafs of P from G'; and rename P to M" in G'.

26. The method as set forth in claim 25, wherein said root is one with the largest measure or, one with the highest degree, or one chosen arbitrarily.

27. The method as set forth in claim 20, wherein the step of computing an object hierarchy H from each connected connection graph G'having atomic parts {P1, P2,,Pm }, is accomplished with the following steps:

add P1, P2, ... , Pm to H; and while |G'|>1 pick a pair (Pi, Pj) whose relative metric based on the common edges of the parts is maximized;

create a new node M' in H to be the parent of Pi and Pj; and collapse Pi and Pj to new node M' (corresponding to M' in H) in G'.

28. The method as set forth in claim 27, wherein said relative metric is the ratio of the total length of common edges to the total length of the smaller boundary of the two adjacent parts.

29. The method as set forth in claim 20, further comprising:

subdividing the atomic parts in the object hierarchies until each node consists of a single triangle or a small number of triangles; and combining the object hierarchies pairwise until a single bounding volume hierarchy is obtained, wherein the single bounding volume hierarchy encompasses individual objects or assemblies thereof.

30. A graphics display apparatus for displaying and computing skeletons, atomic parts generated by space sweeping with a sweep plane, object hierarchies, comprising:

memory means for storing a model of an object and for storing a skeleton, atomic parts generated by space sweeping with the sweep plane, and object hierarchy;

means, responsive to a command from a user of the apparatus, for indicating adjustment to modify the skeleton, atomic parts, or object hierarchy; and processing means, coupled to and responsive to the indicating means, for accessing the memory means to display either the model the skeleton, the atomic parts, or the object hierarchy said processing means including:

means for processing the model of the object into the atomic parts including:

means for preprocessing the model to generate data structures for subsequent processing;

means for generating the skeleton of the model; and means for generating the atomic parts of the model by space sweeping with the sweep plane;

means for computing a connection graph G of the atomic parts;

means for computing a minimal spanning tree (MST) G' for each connected subgraph of G; and means for computing an object hierarchy H from each MST G'.

31. The graphics display apparatus as set forth in claim 30, wherein said processing means includes means for processing the model of the object, so as to produce and store the skeleton, the atomic parts generated by space sweeping with the sweep plane, and the object hierarchy.

32. A graphics display apparatus for displaying and computing a bounding volume hierarchy, comprising:

memory means for storing a model of an object and for storing a skeleton, atomic parts generated by space sweeping with a sweep plane, an object hierarchy, and a bounding volume hierarchy;

means, responsive to a command from a user of the apparatus, for indicating adjustment to modify the skeleton, the atomic parts, the object hierarchy, or the bounding volume hierarchy; and processing means, coupled to and responsive to said indicating means, for accessing said memory means to display either the model, the skeleton, the atomic parts, the object hierarchy, or bounding volume hierarchy said processing means including:

means for processing the model of the object into the atomic parts including:

means for preprocessing the model to generate data structures for subsequent processing:

means for generating the skeleton of the model; and means for generating the atomic parts of the model by space sweeping with the sweep plane;

means for computing a connection graph G of the atomic parts;

means for computing a minimal spanning tree (MST) G' for each connected subgraph of G; and means for computing an object hierarchy H from each MST G'.

33. The graphics display apparatus as set forth in claim 32, wherein said processing means further includes:

means for subdividing the atomic parts in the object hierarchies until each node consists of a single triangle or a small number of triangles; and means for combining the object hierarchies pairwise until a single bounding volume hierarchy is obtained, wherein the single bounding volume hierarchy encompasses individual objects or assemblies thereof.

34. The method as set forth in claim 1, wherein the step of generating the atomic parts of the model includes collating triangles in associated triangle lists (ATLs) of each connected part of the skeleton into a separate atomic part.

* * * * *

UNITED STATES PATENT AND TRADEMARK OFFICE
CERTIFICATE OF CORRECTION

PATENT NO. : 6,825,839 B2
DATED : November 30, 2004
INVENTOR(S) : Zhiyong Huang et al.

It is certified that error appears in the above-identified patent and that said Letters Patent is hereby corrected as shown below:

Title page,
Item [30], please change the Foreign Application Priority Data as follows:
-- Jul. 28, 2000 (SG)      9903605 -- to
"Jul. 28, 1999 (SG)      9903605"

Signed and Sealed this

Fifteenth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,825,839 B2
APPLICATION NO. : 09/793677
DATED : November 30, 2004
INVENTOR(S) : Zhiyong Huang et al.

It is certified that error appears in the above-identified patent and that said Letters Patent is hereby corrected as shown below:

In the Specification:

Column 6, lines 33-63, please change each instance of "v★" to --v*--;

line 41, change "ATL(v1 v2)" to --ATL(v1, v2)--

Column 8, line 1, change "A1" to --$\Delta_1$--;

line 8, delete "from";

lines 30-44 should be corrected to read as follows (equations reversed):

-- Its surface area can be approximated as:

$$A = \int_{u}^{v} f(t)\,dt$$

where $f(t)$ measures the perimeter of the cross-section at $t$. In one embodiment, we can assuming $f(t)$ varies linearly over the branch (as the skeletonization results in fairly uniform branches), thus can simplify the computation to the following:

$$A = (\text{length of branch}) * \frac{f(u) + f(v)}{2} \text{ --}$$

Column 9, line 46, change "with A" to --with $\Delta$--;

Column 11, lines 30-42, correct font size to be consistent and spacing as follows:

--add $P_1, P_2, ..., P_m$ to $H$
while $|G'| > 1$
    add nodes each is of degree larger than one and has at least one or more leaf neighbors to a queue, Q
        while $P = $ dequeue (Q) is not empty
            create a new node $M$ in $H$ to be parent of leaf neighbors of $P$
            create a new node $M'$ in $H$ to be parent of $M$ and $P$
            delete leaf neighbors of $P$ from $G'$
            rename $P$ to $M'$ in $G'$ --

UNITED STATES PATENT AND TRADEMARK OFFICE
CERTIFICATE OF CORRECTION

PATENT NO. : 6,825,839 B2
APPLICATION NO. : 09/793677
DATED : November 30, 2004
INVENTOR(S) : Zhiyong Huang et al.

It is certified that error appears in the above-identified patent and that said Letters Patent is hereby corrected as shown below:

Column 11, (con'd)
lines 55-67, correct font size to be consistent and spacing as follows:

--add $P_1, P_2, ..., P_m$ to $H$
while $|G'| > 1$
    let $h$ be the height of $G'$
    add nodes at level ($h$-1) to Q
    while $P$ = dequeue(Q) is not empty
        create a new node $M'$ in $H$ to be parent of leafs of $P$
        create a new node $M''$ in $H$ to be parent of $M'$ and $P$
        delete leafs of $P$ from $G'$
        rename $P$ to $M'$ in $G'$ --

Column 12, lines 10-18, correct font size to be consistent and spacing as follows:

--*common*$(P_i, P_j) = \Sigma \| (v_a, v_b) \|$ s.t. $(v_a, v_b)$ in $t_k$ where $t_k \in P_i$ *and* $(v_a, v_b)$ in $t_I,$ where $t_I \in P_j$ and boundary$(P_i) = \Sigma \| (v_a, v_b) \|$ s.t. $(v_a, v_b)$ in $t_k$ where $t_k \in P_i$ and not $t_I \in P_i$ s.t. $(v_a, v_b)$ in $t_I$
*relative*$(P_i, P_j) = common\ (P_i, P_j)\ I\ \min(boundary(P_i), boundary P_j))$-- lines 25-27, correct font size to be consistent and spacing as follows:

--add $P_1, P_2, ..., P_m$ to $H$
while $|G'| > 1$
    get $(P_i, P_j)$ from $G'$ with $f$ (*relative*$(P_i, P_j)$) where $f$ could be max or min
    function create a new node $M'$ in $H$ to be the parent of $P_i$ and $P_j$
    collapse $P_i, P_j$ to new node $M'$ (corresponding to $M'$ in $H$) in $G'$ --

Column 13, lines 13-18, correct font size to be consistent and spacing as follows:

--while $|R| > 1$
    get $R_i, R_j$ from $R$ with the smallest *bounding_box*$(R_i \cup R_j)$
    create a new node $M'$ in $H$ to be the parent of $H_i$ and $H_j$
    collapse $R_i, R_j$ to new node $M'$ (corresponding to $M'$ in $H$) in $R$ --

UNITED STATES PATENT AND TRADEMARK OFFICE
CERTIFICATE OF CORRECTION

PATENT NO. : 6,825,839 B2
APPLICATION NO. : 09/793677
DATED : November 30, 2004
INVENTOR(S) : Zhiyong Huang et al.

It is certified that error appears in the above-identified patent and that said Letters Patent is hereby corrected as shown below:

*In the Claims:*

Column 16, claim 24, correct font size to be consistent and spacing as follows:

--24. The method as set forth in claim 20, wherein the step of computing an object hierarchy H from each connected connection graph G' having atomic parts {P1, P2,...,Pm }, is accomplished with the following steps:
    add P1, P2, ..., Pm to H;
    while | G' | > 1
    add nodes where each is of degree larger than one and has at least one or more leaf neighbors to a queue, Q; and
    while P = dequeue (Q) is not empty
    create a new node M' in H to be parent of leaf neighbors of P;
    create a new node M" in H to be parent of M' and P;
    delete leaf neighbors of P from G'; and
    rename P to M" in G'.--

Column 17, line 1, (claim 25) change "{P1, P2,,Pm }" to --{P1, P2,..., Pm}-- line 20, (claim 27) change "G' having atomic parts {P1, P2,,Pm }" to --G' having atomic parts {P1, P2, ..., Pm }--

Signed and Sealed this

Nineteenth Day of December, 2006

JON W. DUDAS
*Director of the United States Patent and Trademark Office*